(12) United States Patent
Narahara et al.

(10) Patent No.: US 7,584,214 B2
(45) Date of Patent: Sep. 1, 2009

(54) INFORMATION PROCESSING APPARATUS, INFORMATION PROCESSING METHOD, AND COMPUTER PROGRAM

(75) Inventors: Tatsuya Narahara, Kanagawa (JP); Hideki Asazu, Tokyo (JP); Nobuyuki Fujiwara, Kanagwa (JP); Kazuhito Sumiyoshi, Tokyo (JP)

(73) Assignee: Sony Corporation (JP)

( * ) Notice: Subject to any disclaimer, the term of this patent is extended or adjusted under 35 U.S.C. 154(b) by 523 days.

(21) Appl. No.: 10/522,640

(22) PCT Filed: May 12, 2004

(86) PCT No.: PCT/JP2004/006370

§ 371 (c)(1),
(2), (4) Date: Sep. 12, 2005

(87) PCT Pub. No.: WO2004/107743

PCT Pub. Date: Dec. 9, 2004

(65) Prior Publication Data

US 2006/0173888 A1 Aug. 3, 2006

(30) Foreign Application Priority Data

May 30, 2003 (JP) ............................. 2003-155138

(51) Int. Cl.
*G06F 7/00* (2006.01)
*G06F 17/00* (2006.01)
*G06F 3/00* (2006.01)
*G06F 13/00* (2006.01)
*H04N 5/445* (2006.01)

(52) U.S. Cl. ...................... 707/104.1; 707/102; 725/38; 725/39; 725/43; 725/44; 725/45; 725/46; 725/52

(58) Field of Classification Search ................. 707/101, 707/102, 104.1; 386/83; 725/91, 38, 39, 725/43–46, 52
See application file for complete search history.

(56) References Cited

U.S. PATENT DOCUMENTS 5,479,266 A * 12/1995 Young et al. .................. 386/83

(Continued)

FOREIGN PATENT DOCUMENTS

JP   2001-036846   2/2001

(Continued)

*Primary Examiner*—Wilson Lee
*Assistant Examiner*—Cheryl M Shechtman
(74) *Attorney, Agent, or Firm*—Lerner, David, Littenberg, Krumholz & Mentlik, LLP

(57) ABSTRACT

Each program content has a plurality of program states, such as "already recorded", "not recorded", "preset for recording", "not preset for recording", and "not received" states. In response to the selection of a related program on a starting-program-related information page, a detailed operation screen for the related program is presented. When the program state of the related program is "already recorded", reproduction or erasure of the recording is presented on the detailed operation screen as a method of operation. When the program is not preset for recording yet, presetting for recording is presented on the detailed operation screen as a method of operation. Information related to a program that is being watched and listened to can be supplied without making the user less interested in something which the user was attracted to while watching the program, and the user can be smoothly guided to a subsequent preset recording operation.

27 Claims, 14 Drawing Sheets

U.S. PATENT DOCUMENTS

| | | | |
|---|---|---|---|
| 7,013,478 B1 * | 3/2006 | Hendricks et al. | 725/46 |
| 2002/0012525 A1 | 1/2002 | Yuen et al. | |
| 2002/0100049 A1 | 7/2002 | Yamato et al. | |
| 2002/0188949 A1 * | 12/2002 | Wang et al. | 725/46 |
| 2003/0028889 A1 * | 2/2003 | McCoskey et al. | 725/91 |
| 2004/0221310 A1 * | 11/2004 | Herrington et al. | 725/46 |
| 2007/0094292 A1 * | 4/2007 | Kataoka | 707/102 |

FOREIGN PATENT DOCUMENTS

| | | |
|---|---|---|
| JP | 2002-051291 | 2/2002 |
| JP | 2002-199294 | 7/2002 |
| JP | 2002-218332 | 8/2002 |
| JP | 2003-018492 | 1/2003 |
| WO | WO-00/59214 A1 | 10/2000 |

* cited by examiner

INFORMATION PROCESSING APPARATUS, INFORMATION PROCESSING METHOD, AND COMPUTER PROGRAM

BACKGROUND OF THE INVENTION

The present invention relates to an information processing apparatus, information processing method, and computer program for performing processes such as recording and reproduction of contents and, more particularly, to an information processing apparatus, information processing method, and computer program for supporting contents processing such as recording, preset recording, and reproduction of a television program. More particularly, the invention relates to an information processing apparatus, information processing method, and computer program for supporting operations on contents, such as searching, preset recording, and reproduction of a television program, the support being provided in consideration of the passive nature of the act of watching television programs. Still more particularly, the invention relates to an information processing apparatus, information processing method, and computer program for supporting operations on contents, such as searching, preset recording, and reproduction of a television program, without making a user less interested in something which the user has been attracted to while watching a television program.

In the field of broadcasting techniques, there is a rapid trend toward the use of digital data. This is attributable to the facts that digital data provides higher image quality and higher sound quality than analog data because it allows higher utilization of a band and that digital data has a higher affinity to data other than video and audio data.

When broadcast contents are digital data, data of four contents can be carried over a single channel, and services of higher quality and wider variety can be provided because data for high-definition televisions can be transmitted as it is. For example, improved services can be provided to users (audience) by sending them various kinds of system information including an EPG (Electric Program Guide) along with video information and audio information (an EPG includes functions such as providing information on a schedule and program titles of broadcast programs and preset recording of programs in a VTR).

Further, since data in a digital form has a high affinity to information apparatus other than televisions such as general-purpose computer systems, digital broadcasting is expected to unite broadcasting and communication. For example, a tuner card for digital satellite data broadcasts may be mounted in a general-purpose computer system to receive an EPG which is then analyzed by the computer to provide a window-display of an electronic program table on a computer display, which allows program switching and preset recording to be performed through operations on a mouse and cursor. Obviously, digital broadcast data can be digital-recorded as it is in a hard disc incorporated in a computer. Upper links between receiving clients and broadcast stations utilizing computer networks will allow bi-directional services to be provided.

Recently, server-type broadcasting systems have been spreading, in which a receiver (a television or video recorder/player) incorporating a mass storage such as a hard disc device or DVD (Digital Versatile Disc) recorder is used to receive broadcast contents, temporarily store them in the receiver, and reproduce them thereafter.

A server-type broadcasting system allows not only real-time audiovisual reception such as normal television reception, but also allows pre-distributed pictures and sounds to be watched and listened to at a specified time, the use of information distributed along with the pictures and sounds allowing scene search or audiovisual reception of a digest in the latter case.

In the case of a system such as an HDD recorder or DVD recorder which can record programs for several tens of hours, it is considered important to perform operations for preset recording efficiently in order to make the act of watching television more useful.

For example, a user can refer to an EPG distributed along with a program to identify or presume programs that he or she wishes to watch. In this case, however, the user must perform a complicated operation of activating the EPG first and searching for and selecting the programs he or she wishes to watch on the EPG screen thereafter.

For example, let us assume that a user attempts to find and record a program strongly related to a recorded program (or a program that is presently on the air) that the user is watching, e.g., the next broadcast of the program or another program featuring the same person(s) based on an interest aroused while watching the program. Then, the user must activate an EPG screen to find the program from among a large number of programs based on the day of the week or the channel, or to search for the program using the title or cast of the program. In this case, the user must temporarily stop watching the program to perform the operation of searching for the program to be recorded. Further, information related to a program is frequently provided on an official web site of the program, but it is required to perform a complicated operation of activating a web browser and inputting a URL in order to access detailed information.

Watching television is a passive way of enjoyment in its inherent nature. On the contrary, searching for a program for preset recording requires a user to perform a positive operation, and the searching operation can make the user less interested in something which the user has been attracted to while watching a program.

SUMMARY OF THE INVENTION

It is an object of the invention to provide an excellent information processing apparatus, information processing method, and computer program which can provide a favorable support for contents processing such as recording, preset recording, and reproduction of a television program.

It is another object of the invention to provide an excellent information processing apparatus, information processing method, and computer program which can provide favorable support for operations on contents, such as retrieval, preset recording, and reproduction of a television program, in consideration of the passive nature of the act of watching a television program.

It is still another object of the invention to provide an excellent information processing apparatus, information processing method, and computer program which can provide favorable support for operations on contents, such as retrieval, preset recording, and reproduction of a television program, without making a user less interested in something which the user has been attracted to while watching a television program.

The invention has been made taking the above-described problems into consideration, and the invention provides, in its first aspect, an information processing apparatus for supporting operations on program contents distributed at scheduled times, the information processing apparatus including a program information managing section which manages information on program contents; a starting program setting section which sets a program at which the operations are started; a starting-program-related information generating section which retrieves information on programs in all program states and extracts programs related to the starting program to generate a starting-program-related information page; and a detailed operation screen presenting section which presents a detailed operation screen in response to the selection of a program related to the starting program on the starting-program-related information page, the detailed operation screen including a method of operation applicable to the related program depending on the program state thereof.

The starting program setting section sets as the starting program program contents selected from among program contents which are currently being reproduced, watched and/or listened to by a user or from among program contents in a predetermined program table. The starting-program-related information generating section retrieves programs which are related to the starting program with respect to each item of interest based on degrees of relationship with the starting program and generates the starting-program-related information page from the results of the retrieval by arranging the related programs in descending order of the items in terms of the degree of relationship to the starting program. By starting up a browser, the user can browse the starting-program-related information page and perform an operation to the programs related to the starting program such as present recording.

Therefore, according to the invention, a program which is currently being watched or reproduced by a user is used as a starting point, and other programs related to the same are introduced in descending order of relationship. As a result, favorable support can be provided for operations on contents, such as searching, preset recording, and reproduction of a television program, without making a user less interested in something which the user has been attracted to while watching a television program. That is, favorable support can be provided for operations on contents, such as searching, preset recording, and reproduction of a television program, in consideration of the passive nature of the act of watching a television program.

Each of the program contents has a plurality of program states. That is, the program content may have already been recorded, may have not been recorded yet, may have been preset for recording, may not have been preset for recording yet, or may have not been received yet. According to the invention, in response to the selection of a related program on the starting-program-related information page, a detailed operation screen for the related program is presented. Since the detailed operation screen provides an applicable method of operation depending on the program state, a user can smoothly perform operations such as watching, reproduction, and preset recording of program contents.

For example, when the program state of a related program thus selected is "already recorded", the detailed operation screen presenting section may present reproduction and/or erasure of the recording as the method of operation.

Alternatively, when the program state of a related program thus selected is "preset for recording", the detailed operation screen presenting section may present cancellation of recording and/or confirmation of recording as the method of operation.

Alternatively, when the program state of a related program thus selected is "not preset for recording", the detailed operation screen presenting section may present preset for recording as the method of operation. A plurality of processes for preset recording, such as "recording the program this time only", "recording the program every week", and "recording the program every day", may be presented.

The invention provides, its second aspect, a recording medium recorded with a computer program which is described in a computer-readable form to execute a process for supporting operations on program contents distributed at scheduled times where information on each program content is managed using a database. The process includes setting a program at which the operations are started; searching the database for information on programs in all program states to extract programs related to the starting program and generating a starting-program-related information page including the extracted related programs; and presenting a detailed operation screen in response to the selection of a program related to the starting program on the starting-program-related information page, the detailed operation screen including a method of operation applicable to the related program depending on the program state thereof.

The computer program in the second aspect of the invention is defined as a computer program which is described in a computer-readable form to achieve a predetermined process on a computer system. In other words, when the computer program in the second aspect of the invention is installed in a computer system, it operates on the computer system in a cooperative manner, and the same effect and advantage as those of the information processing apparatus in the first aspect of the invention can therefore be achieved.

Other objects, features, and advantages of the invention will become apparent from a detailed description which will be made based on embodiments of the invention to be described later and accompanying drawings.

DETAILED DESCRIPTION

An embodiment of the invention will now be described with reference to the drawings.

Figure 1:
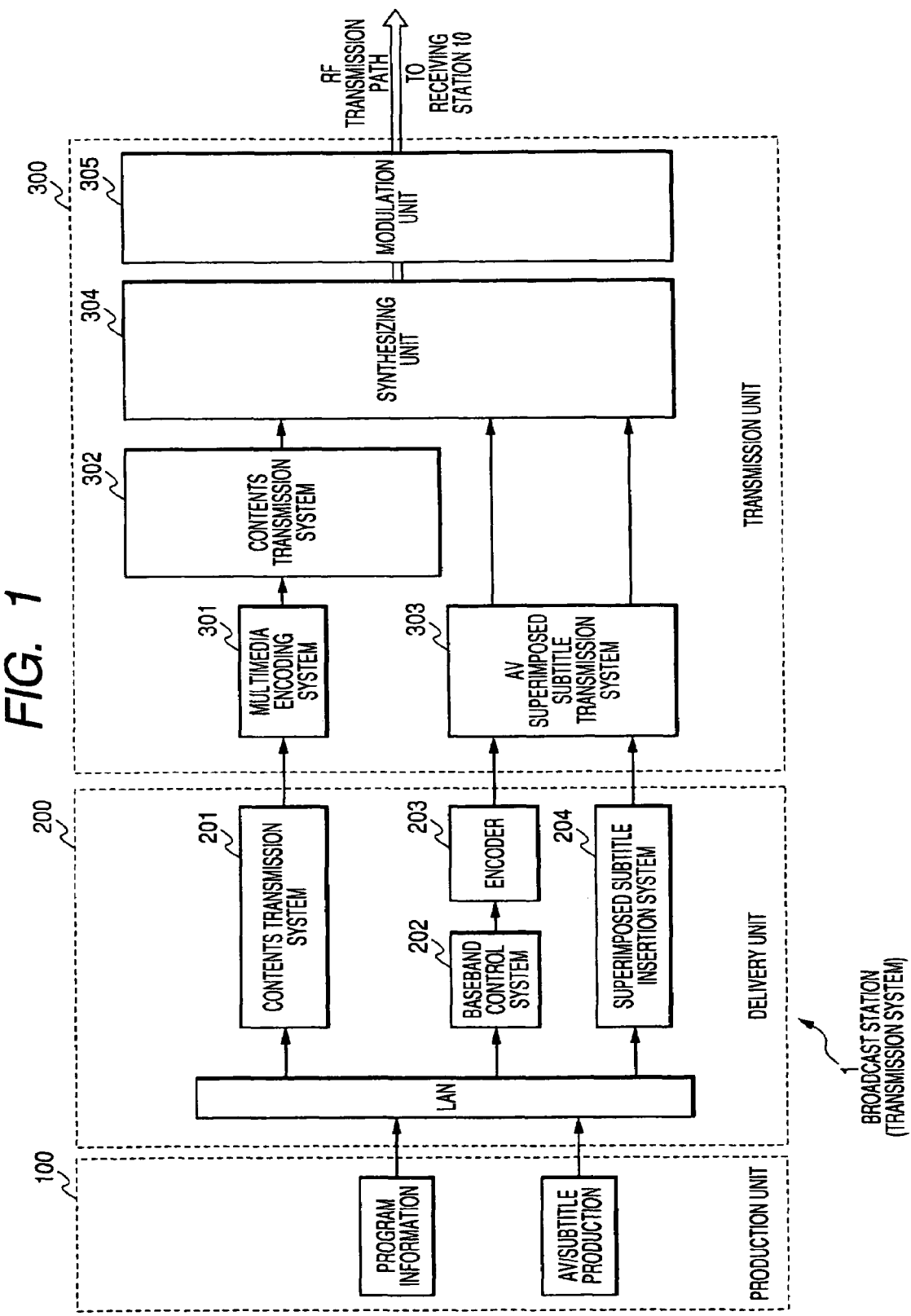
FIG. 1 is a diagram schematically showing a system configuration for transmitting broadcast contents.

FIG. 1 schematically shows a system configuration for transmitting broadcast contents from a broadcast station. The transmission system 1 comprises a production unit 100, a delivery unit 200, and a transmission unit 300. Each of the units will be described below.

The production unit 100 corresponds to a site of production of contents of broadcast program information to be delivered as digital broadcast contents. That is, the production unit 100 produces individual streams such as video and audio streams of which a broadcast program is made up, data of subtitles and the like and, in addition, resource elements such as an EPG.

Those broadcast contents including the body of the program made up of individual streams, such as video and audio steams and program information, are transferred to the delivery unit 200, for example, via a LAN (Local Area Network) constructed in the broadcast station 1.

At the delivery unit 200, data to be delivered is packeted by each of a contents transmission system 201, a baseband control system 202, an AV encoder 203, and a superimposed subtitle insertion system 204, and is thereafter passed to the transmission unit 300.

At the transmission unit 300, the program information is encoded by a multi-media encoding unit 301 and passed to a contents transmission system 302. A synthesizing unit 304 synthesizes data output by each of the contents transmission system 302 and an AV superimposed subtitle transmission system 303. A modulation unit 305 performs RF modulation on the synthesized signal which is then transmitted to a receiving station 10 through an RF transmission path.

In the RF transmission path, the RF signal is first transmitted to a broadcast satellite (not shown) from a transmission antenna provided at the broadcast station 1, and the signal is then received by a reception antenna of the receiver 10 via a propagation path.

Figure 2:
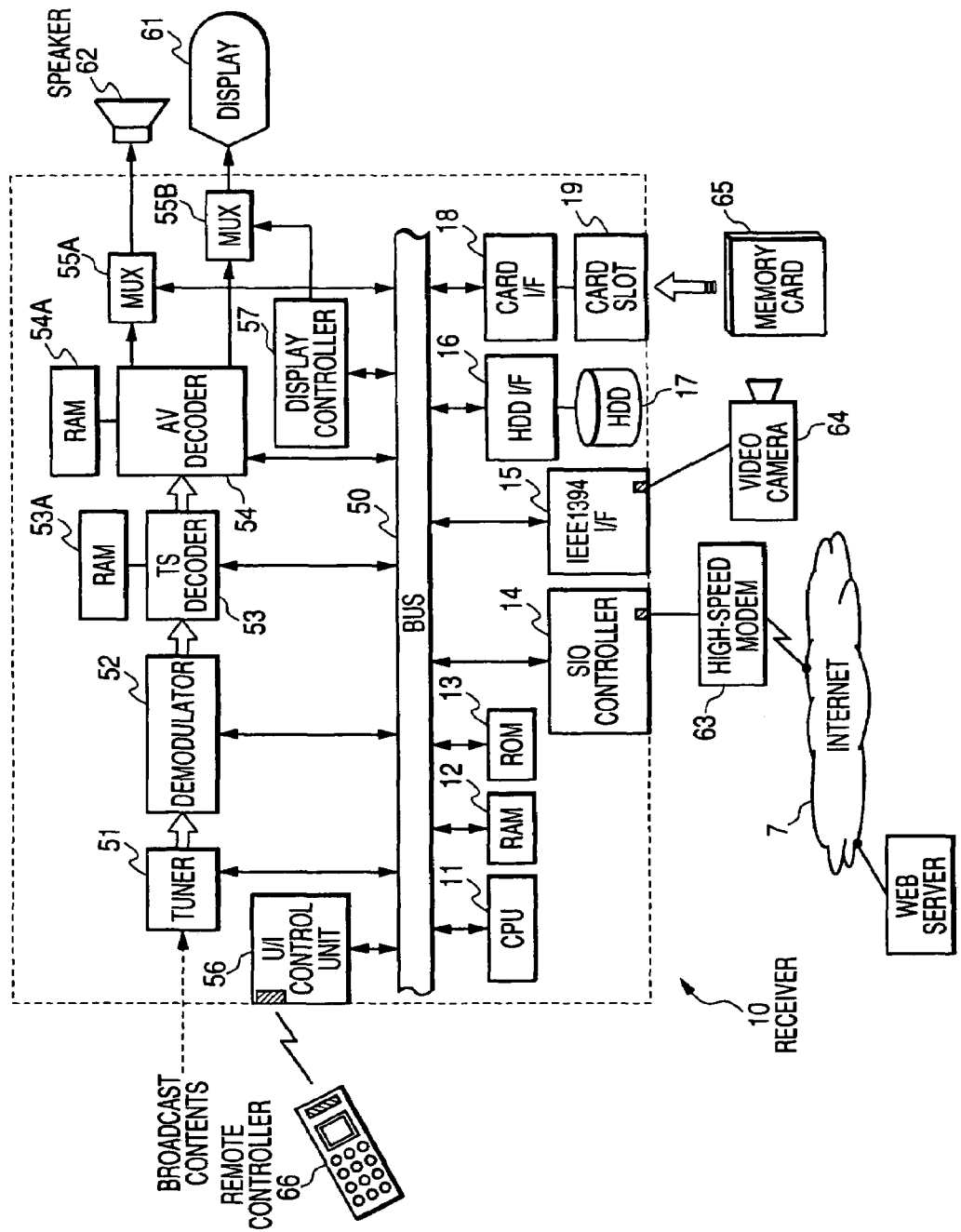
FIG. 2 is a diagram schematically showing an example of a hardware configuration of a receiver 10 which receives broadcast contents and performs recording and preset recording of the same.

FIG. 2 schematically shows an example of a hardware configuration of the receiver 10 which receives broadcast contents and performs recording and preset recording.

In the receiver 10, a CPU (Central Processing Unit) 11 as a main controller is interconnected with each hardware component through a bus 50 to execute general control over each component. Each part of the receiver will be described below.

A broadcasting wave received by the antenna (not shown) is supplied to a tuner 51. The broadcast wave is in accordance with a prescribed format, but it may be a wave broadcast over wires or a surface wave rather than a broadcast wave for satellite broadcast as described above, and no particular limitation is set on the same.

The tuner 51 performs tuning to a broadcast wave from a predetermined channel or selects a broadcasting station according to an instruction from the CPU 11 and outputs received data to a demodulator 52 provided downstream thereof. The demodulator 52 demodulates the received data which has been subjected to digital modulation. The configuration of the tuner 51 may be changed or expanded as occasions demand depending on which of analog and digital broadcasting waves is transmitted to the same.

The demodulated digital data is a transport stream (TS) which is, for example, constituted by AV data compressed according to the MPEG2 method and program information which are multiplexed with each other. The former AV data are constituted by video and audio information of which the body of a broadcast program is made up and subtitle data. The latter program information is data associated with the body of the broadcast program and is used for an EPG or preset recording.

A TS decoder 53 interprets the transport stream and separates it into the AV data compressed according to the MPEG2 method and the program information, the former being transmitted to an AV decoder 54, the latter being transmitted to the CPU 11 via the bus 50. The TS decoder 53 may include a memory 53A for saving work data as a local memory of itself.

Upon receipt of the real-time AV data compressed according to the MPEG2 method from the TS decoder 53, the AV decoder 54 separates it into compressed video data and compressed audio data. It performs a decompression process on the video data according to the MPEG2 method to reproduce the original video signal and performs PCM (Pulse Code Modulation) on the audio data and synthesizes it with additional sounds to obtain a reproduced audio signal. The AV decoder 54 may include a memory 54A for saving work data as a local memory of itself. The reproduced video signal is provided to a display 61 through a multiplexer 55B as a display output, and the reproduced audio signal is provided to a speaker 62 through a multiplexer 55A as an audio output. Referring to the broadcast contents of a program for which presetting for recording has been made, compressed video data and compressed audio data are transferred to a hard disc device 17 via the bus 50 and are temporarily recorded therein without being decompressed. In this case, when the contents are watched and listened to, they are subjected to a decompression process and output for reproduction by the AV decoder 54 after being read out from the hard disc device 17.

A user interface control unit 56 is a module for processing operations input from a user and, for example, it has operation buttons/switches (not shown) for direct manual operations of a user and a function of accepting remote operations from a remote controller 66 through infrared (IR) radiation. It may include a display panel and LED indicators (not shown) for displaying the contents of the current setting. A user can perform operations such as tuning to a broadcast program, recording, preset recording, reproduction, and erasure of a recorded program through the remote controller 66 and the user interface control unit 56.

The CPU 11 is a main controller which exerts general control over operations of the receiver 10 as a whole. The CPU 11 can also perform processes such as recording, preset recording, and reproduction on program information transferred to the same via the bus 50.

A RAM (Random Access Memory) 12 is a writable volatile memory used to load programs and codes to be executed by the CPU 11 and to write work data for a program that is executed. A ROM (Read Only Memory) 13 is a read only memory for permanently storing a self diagnosis and/or initialization program to be executed when the power supply of the receiver 10 is turned on and a microcode for hardware operations.

A serial input/output (SIO) controller 14 is a peripheral controller for serial data exchange between the receiver 10 and an external apparatus. A high-speed modem 63 for modulating and demodulating data transmitted on an analog telephone line is externally connected to a serial port provided on the SIO controller 14. The high-speed modem 63 establishes a PPP (Point-to-Point Protocol) connection (or a different form of connection) to a predetermined access point (not shown), and the receiver 10 can therefore be connected to an internet 7 as a wide area network, and an upper link to a broadcast station can be formed.

An IEEE (Institute of Electrical and Electronics Engineers) 1394 interface 15 is a serial high-speed interface which allows data transmission and reception at several hundred MBps. An external apparatus in compliance with IEEE 1934 can be daisy-chain-connected or tree-connected to an IEEE 1394 port. For example, apparatus in compliance with IEEE 1394 include a video camera 64 and a scanner (not shown).

A hard disc driver (HDD) 17 is an external storage for accumulating programs and data in the form of files having a predetermined format, and it has a relatively large capacity of several ten to several hundred GB. The HDD 17 is connected to the bus 50 through a hard disc interface 16. In the present embodiment, the HDD 17 is used for recording, preset recording, and reproduction of a received broadcast program and accumulation of information related to programs.

A card interface 18 is a device for implementing a bus protocol between a card type device 65 loaded in a card slot 19 and the bus 50. An example of the card-type device 65 is a PC card which is similar in size to a credit card and which has a cartridge-type configuration. The PC card is in compliance with specifications referred to as "PC Card Standard" which have been jointly formulated by PCMCIA (Personal Computer Memory Card Interface Association) and JEIDA (Japan Electronic Industry Development Association).

A display controller 57 is a dedicated controller for controlling display outputs such as broadcast program information based on data broadcast contents.

In the receiver 10, the tuning operation of the tuner 51 is controlled according to a command input by a user through the user interface control unit 56, and operations such as control over display of program information are also performed. Specifically, the CPU 11 processes program information transferred from the TS decoder 53 to convert it into data for display, which is in turn supplied to the display controller 57. The display controller 57 generates image signals of the program information based on the display data and supplies them to the multiplexer 55B.

The CPU 11 also processes audio data included in the program information and supplies it to the multiplexer 55A via the bus 50. The multiplexers 55A and 55B multiplex the display data and audio data supplied from the CPU 11 with video data and audio data (along with subtitles), respectively, as the body of the broadcast program output by the AV decoder 54, and externally output such data to the display 61 and the speaker 62, respectively.

Further, the CPU 11 performs an operation of reproducing a broadcast program that it has received, an operation of recording or preset recording, and an operation of erasing a recorded program.

Figure 3:
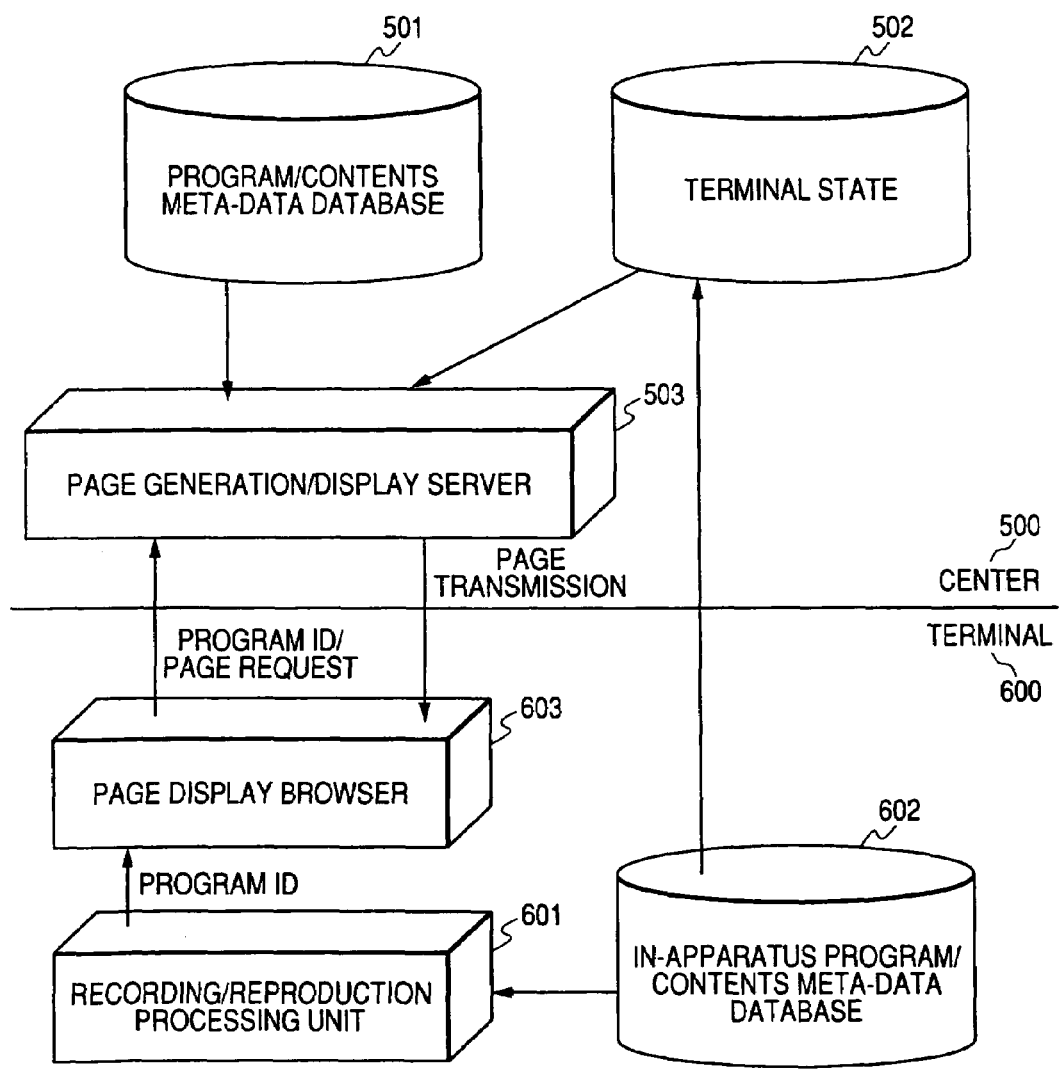
FIG. 3 is a diagram schematically showing a functional configuration of a system for providing information related to a program that a user is watching without making the user less interested in something which the user has been attracted to while watching the program.

In the present embodiment, information related to a program that is presently watched is supplied without making the user less interested in something which the user has been attracted to while watching the program to guide the user to a subsequent operation for preset recording smoothly. This is achieved by a co-operation between broadcast stations managing program information or a center server (hereinafter simply referred to as "center") that cooperates with the broadcast stations and the receiving terminal 10 (hereinafter simply referred to as "terminal") at the user. FIG. 3 schematically shows a configuration of such a system.

A center 500 comprises a program/contents meta-data database 501 for storing the contents of the bodies of broadcast programs and contents meta-data such as an EPG associated with the same, a terminal state database 502 for managing information on the state of a program at the terminal of each user, the state being any of "watched", "recorded", and "preset-recorded" states, and a page generation/display server 503 for generating a program-related information page based on the program/contents meta-data and the terminal states and providing the page to the terminals. The program-related information page will be detailed later.

A terminal 600 has a recording/reproduction process unit 601 for performing processes such as recording, preset recording, and reproduction of a received broadcast program, an in-apparatus program/contents meta-data database 602 for managing received broadcast contents and meta-data such as an EPG distributed along with the broadcast contents inside the apparatus, and a page display browser 603 for giving access to a program-related information page provided by the center 500 by displaying the same. In practice, such functions and features are realized by executing a predetermined application for retrieving and accessing the program-related information on the CPU 11.

When a user performs a predetermined operation such as pushing a button of the remote controller 66 while reproducing a recorded program or watching a program on the air, the recording/reproduction process unit 601 passes the program ID to the page display browser 603 in response. In response to the change in the program state in the terminal 600, the internal program/contents meta-data database 602 transmits the program information to the center 500 any time. The starting program may be identified by transferring the date and time of broadcast when the button was pushed, the name of the broadcast station and the area of broadcast or the broadcast station ID to the center to search for the program in the contents/meta-data database 501.

The page display browser 603 requests the center 500 to provide a program-related information page. A program-related information page includes program IDs. The center 500 generates a program-related information page based on program/contents meta-data and the state of the terminal and returns it to the terminal 600. The page display browser 603 displays the program-related information page for the user's access.

In the present embodiment, in response to a user's operation of the remote controller 66, a process of presenting program-related information is activated. At this time, a recorded program that is being reproduced or a program on the air that is being watched is treated as a starting point, and program-related information associated with the starting program is generated. It is hereinafter referred to as "starting-program-related information".

The program/contents meta-data database 501 at the center 500 manages information on each broadcast program by categorizing it into a plurality of items using program attributes such as "schedule for the next broadcast", "cast", "title", and "genre" or other methods for associating programs. A degree of relationship with the program is assigned to each item. For example, the schedule for the next broadcast may be highest in the degree of relationship with the program and may be followed by the cast, title, and genre in the descending order of relationship with the program. Then, programs related to the starting program are searched for in the database with respect to each item. In the present embodiment, the search is aimed at all programs in the past and future in the database or all programs on a time basis. The search for television programs in the past is aimed at only programs which can be watched or programs which have already been recorded. Referring to a television program in the future, it is in either of two program states, i.e., it has already been preset for recording or not preset for recording yet.

The starting-program-related information page is configured based on results of the database search by arranging related programs which have hit in descending order of the items in relationship with the starting program, and the page is output to be displayed as a browser screen.

Figure 13:
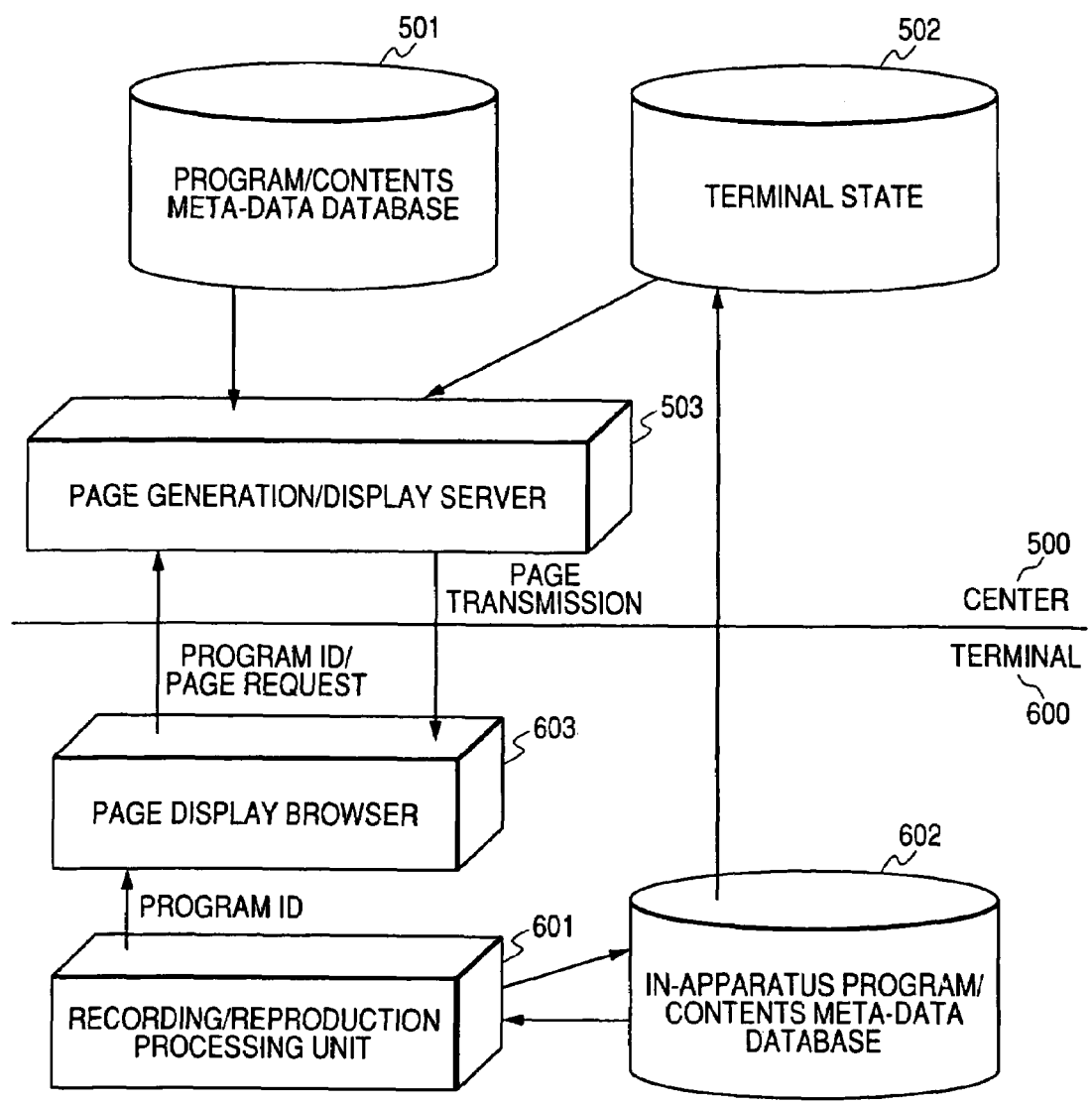
FIG. 13 shows an example of another system configuration for generating a starting-program-related information page.
Figure 14:
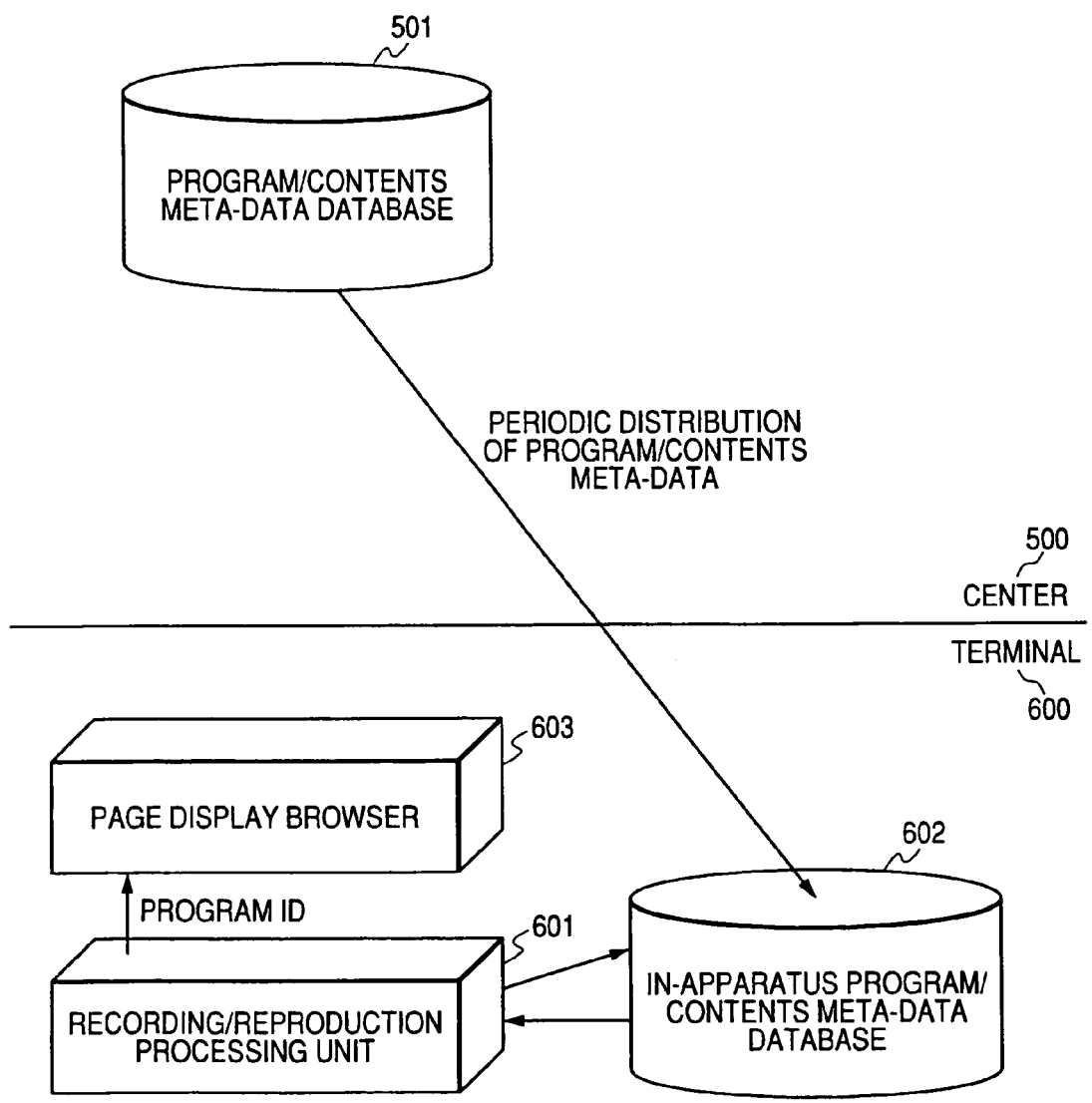
FIG. 14 shows an example of another system configuration for generating a starting-program-related information page.

In the example shown in FIG. 3, the starting-program-related information page is generated by a cooperation between the center 500 and the terminal 600. On the contrary, as shown in FIG. 13, the center 500 may generate the starting-program-related information page alone. In this case, however, the terminal 600 transmits meta-data to the center 500 each time the program state in the terminal 600 changes. Alternatively, the starting-program-related information page may be generated in the terminal 600 as shown in FIG. 14. In this case, however, the center 500 periodically distributes program/contents meta-data that constitute raw data of the starting-program-related information page.

On the starting-program-related information page, results of the database search are arranged in descending order of the items in relationship with the starting program and are output for display. On the starting-program-related information page, display of a related program of interest is switched depending on states of the program such as "already recorded", "preset for recording", and "not preset for recording", and contents of an operation on the program vary accordingly (a description will follow in this connection).

Table 1 shown below summarizes a method for association with the starting program.

TABLE 1

| Information on association with Starting-program | Title of Related Program | Detail of Search Criteria |
| --- | --- | --- |
| Program (/product) attribute data | schedule for the next time of broadcast | matching date and time or day of the week, time of broadcast, title, the broadcast station; search range is very near time zone, the same time zone of the next day, the same time zone in the next week |
| | related programs in terms of cast | matching name of people in cast item or matching name of people extracted from contents of program |
| | related programs in terms of genre | matching genre name in genre item |
| | similar programs | programs having larger number of matching attributes are preferentially displayed as being higher in similarity |
| Definition by manager | campaign | associated by system manager |

An exemplary method for association with the starting program is the use of program (product) attributes or definitions by a manager.

Program (product) attributes are categorized into items such as "schedule for the next time of broadcast", "related programs in terms of cast", "related programs in terms of genre". The "next time" or the schedule for the next time of broadcast can be searched based on the date and time (or the day of the week), the title, the broadcast station of the program or based on time zones such as a very near time zone, the same time zone of the next day, or the same time zone in the next week. Other programs "related in terms of cast" can be searched based on the cast or names of people extracted from the contents of the program. The "related programs in terms of genre" can be searched based on genre information. Similar programs can also be searched based on degrees of similarity between attributes of programs.

Figure 4:
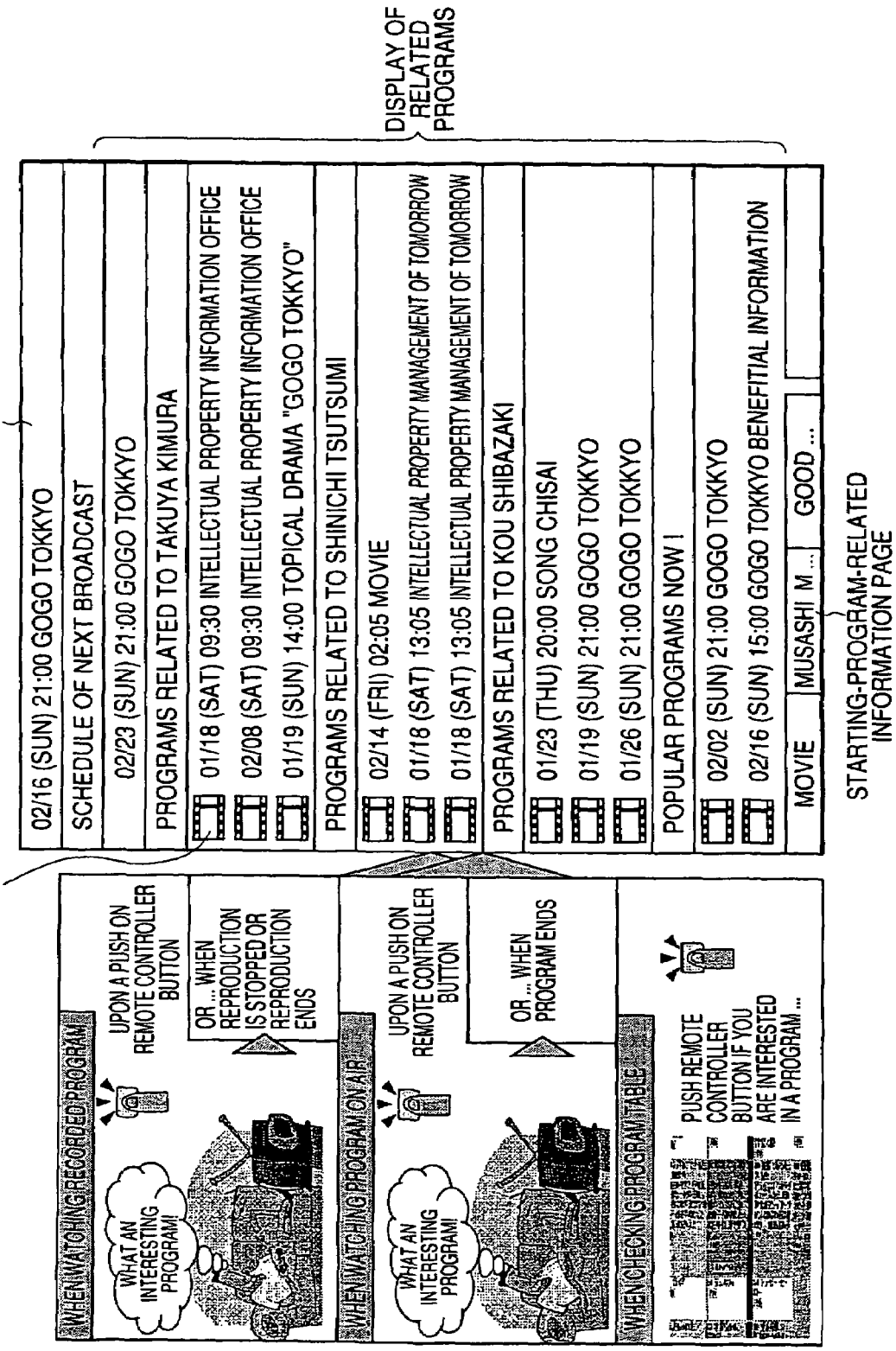
FIG. 4 is illustrations showing how to input a starting program and a configuration of a starting-program-related information page.
Figure 5:
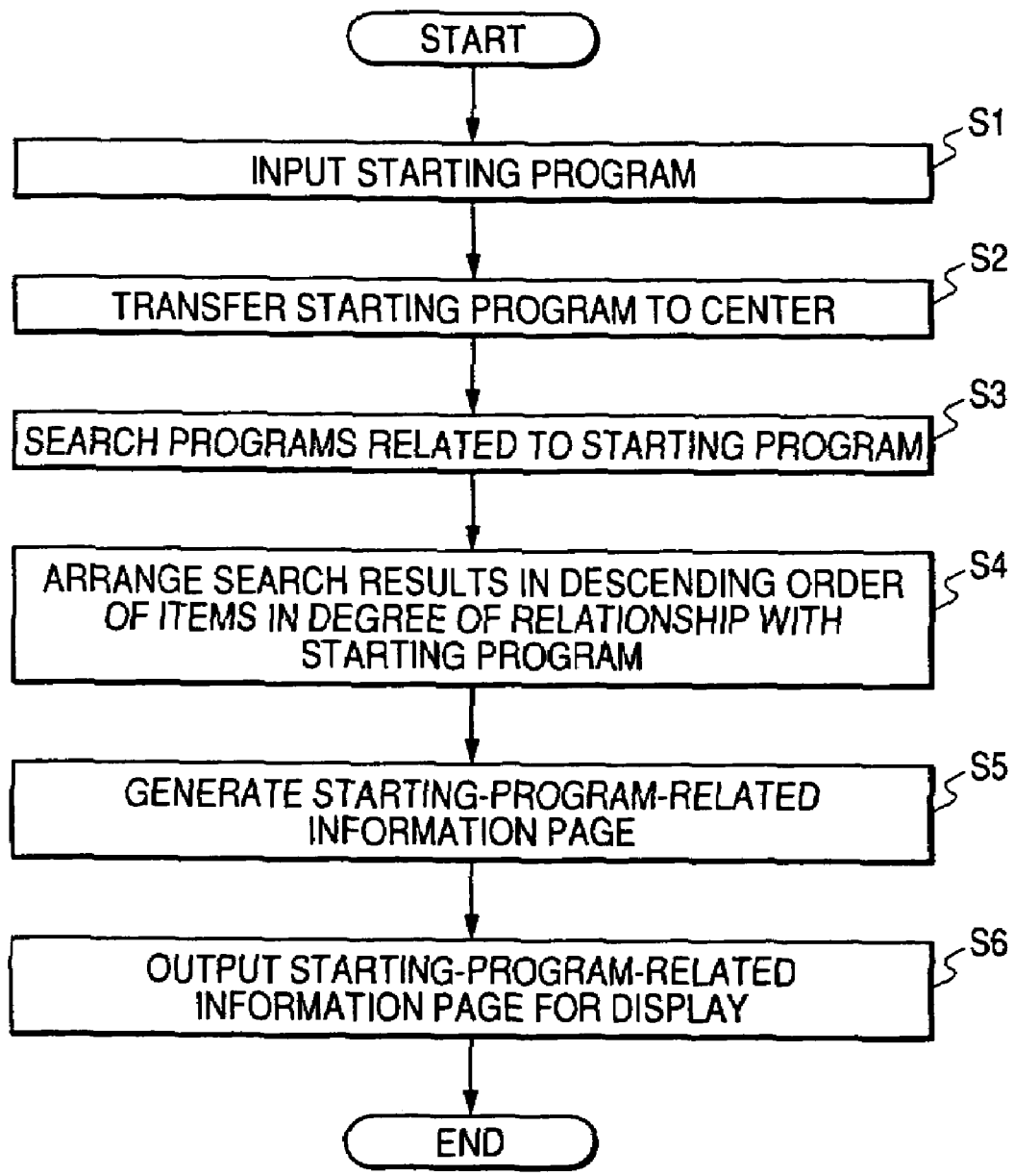
FIG. 5 is a flow chart showing steps of a process of providing a starting-program-related information page.

FIG. 4 shows how to input a starting program and a configuration of a starting-program-related information page. FIG. 5 shows steps of a process for providing a starting-program-related information page in the form of a flow chart.

First, a starting program is input (step S1). When a predetermined button on the remote controller 66 is pushed during audiovisual reception of a recorded program, the program being reproduced is set as a starting program. Alternatively, the recorded program is set as a starting program when the reproduction of the program is stopped or when the reproduction ends.

When a predetermined button on the remote controller 66 is pushed during audiovisual reception of a program on the air or when the program ends, the program is set as a starting program.

When a predetermined program column is operated with the remote controller 66 or the like while a program table is being accessed by activating an EPG, the relevant program is set as a starting program.

When a starting program is set, the program ID of the same is transferred from the terminal 600 to the center 500 (step S2). Instead of the program ID, the date and time of broadcast at the time of the push on the button, the name of the broadcast station, and the area of the broadcast or the broadcast station ID may be transferred to the center to allow a search into the contents meta-data database 501 and identification of the starting program.

At the center 500, the program/contents meta-data database 501 is searched according to predetermined rules for searching, and a starting-program-related information page is generated based on results of the search. The search is aimed at all programs in the past and future in the database or all programs on a time basis.

In the program/contents meta-data database 501, information on each broadcast program is managed by categorizing it into a plurality of items using program attributes or other methods for associating programs. A degree of relationship with the program is assigned to each item. First, programs related to the starting program with respect to each item are searched for in the database (step S3). The search is aimed at all programs in the past and future in the database.

Next, results of the search into the program/contents meta-data database 501 are arranged in descending order of the items in relationship with the starting program (step S4) to generate a starting-program-related information page (step S5).

The starting-program-related information page thus generated is returned to the terminal 600. At the terminal 600, a browser is activated to output the starting-program-related information for display (step S6). The screen of this page shows information on programs related to the starting program, and preset recording of the programs and other user operations are accepted.

On the starting-program-related information page, a list of recommended programs is displayed based on the starting program in descending order of the items in terms of the degrees of relationship set for them, the items being "schedule for the next broadcast", "cast", "title", and "genre", for example. In addition, the display of the starting-programrelated information page may include statistical results (such as an audience rating and vote results) associated with the starting program, guidance on community sites or the like, and links to other applications that deal with the starting program.

In the column of the schedule for the next broadcast, the schedule for the next broadcast of the starting program is presented along with the date and time and the program title.

Referring to columns of related programs, the related program columns are arranged such that if an item is ranked higher, the higher is its degree of relationship to the program, the cast coming first and being followed by the title, and the genre, for example. The screen may be scrolled to move to related program columns associated with items for which lower degrees of relationship are set (not shown). The user is allowed to access and select a program with improved convenience by displaying programs in descending order of degrees of relationship with the starting program.

In cast-related program columns, other programs featuring the (major) cast of the starting program are presented along with the dates and times of broadcast and the program titles. In title-related program columns, other programs related to the title of the starting program are presented along with the dates and times of broadcast and the program titles. In the program list showing such related program columns, a "preset for recording" icon may be displayed for a program which has already been preset for recording such that the preset recording operation will not be duplicated. When the same program is among entries of the cast column and the column of another item at the same time, the information on the program in either of the columns may be deleted to display information of more programs.

When there are too may programs/contents in related program columns, their number may be reduced by screening them in descending order of degrees of their conformity to the preference of the user, in ascending or descending order of their closeness to the starting program in terms of broadcasting date and time, in ascending or descending order of their closeness to the date and time of display of the starting-program-related information page, or in descending order of evaluation of them based on audience rating information or voting by a plurality of users.

In the example shown in FIG. 4, the starting-program-related information page shows the schedule for the next broadcast and programs related to each of the performers who appeared in the program. For example, a performer is put in order based on the importance of the role of the performer in the starting program (e.g., whether the performer played the leading role or not) or the degree of the user's interest in the performer (whether the user is a fan of the performer or not).

In the present embodiment, the search is aimed at all programs in the past and future in the database. Referring to television programs in the past, only programs which can be watched or which have been recorded are searched and displayed on the page. Television programs in the future may be in two program states, i.e., they may have been preset for recording or not preset for recording. When a related program on the starting-program-related information page has already been recorded or preset for recording, the display of the program is accompanied by an icon indicating such a program state.

When the same program is displayed a plurality of times as a result of a search for a plurality of performers in a television serial, the program may be displayed only at the top of the page to display as many related programs as possible on the screen of a limited size. When only a small number of programs are retrieved in relation to a performer at a low rank in the page or in any other relation, the programs may be displayed in duplicate for the performer, so that a constant number of programs are displayed in each relation.

When only a small number of programs are related to a program which has been set as a starting program, the number of related contents set by the manager may be increased, and the number may be decreased in the reverse case to generate a page that always displays a constant amount of information.

The types and order of relationships in a starting-program-related information page may be changed depending on the attributes of the starting program, such as the genre of the same. The types and order of relationships in a starting-program-related information page may be customized based on information on the preference of a user who has requested the same.

In a related program displayed on a starting-program-related information page, methods of operation applicable to the program are embedded. For example, when an entry such as "schedule for the next broadcast" is selected from a list of recommended program, dialogue boxes or a detailed presetting screen appears, the screen including a summary of the relevant program and methods of operation for the program, such as "recording the program this time only", "recording the program every time", and "recording the program every day". An operation of presetting recording can be directly performed through the dialogue boxes or detailed presetting screen.

Figure 6:
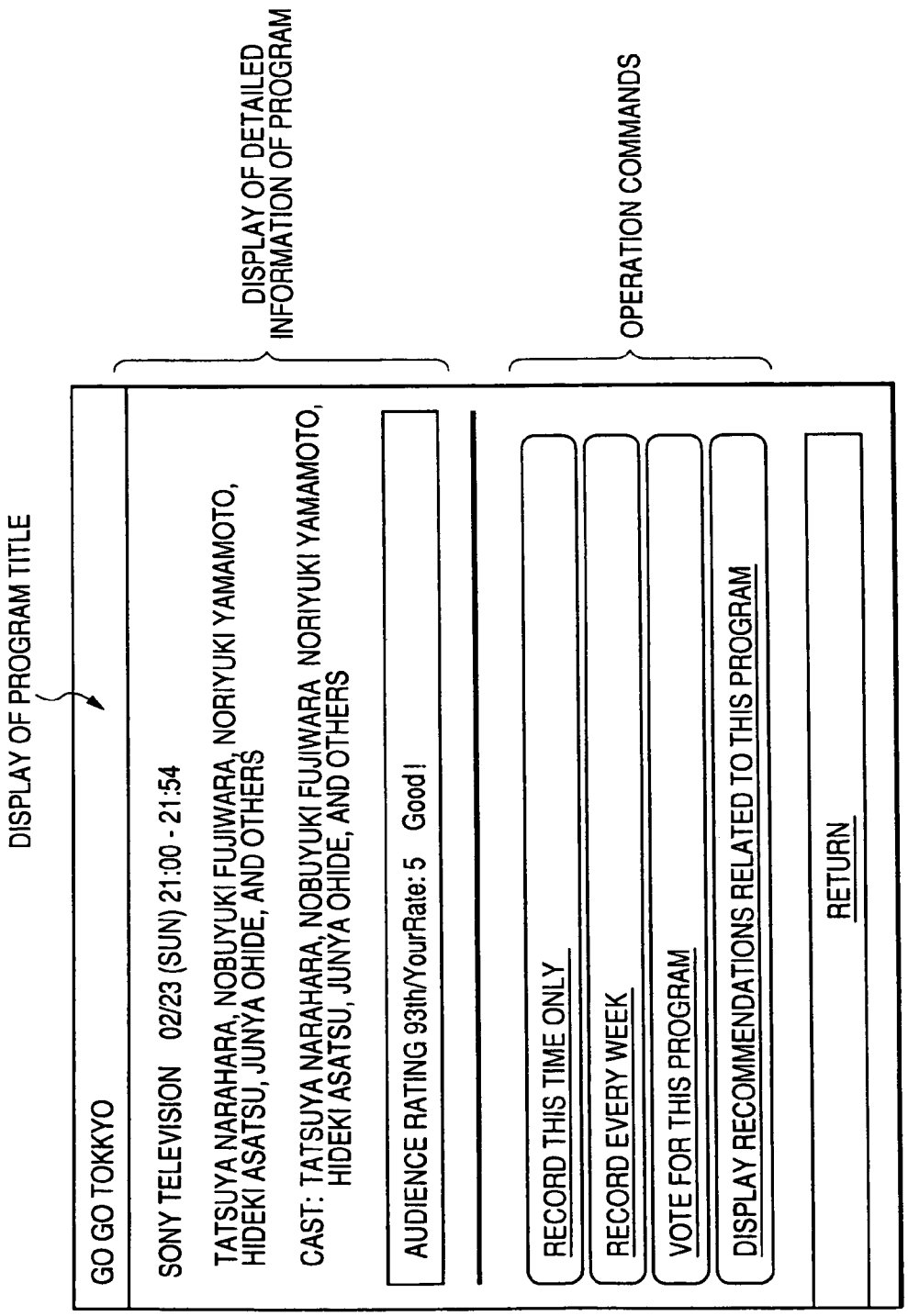
FIG. 6 shows an example of a configuration of a detailed reproduction screen.

FIG. 6 shows an example of a configuration of a detailed presetting screen that appears when "schedule for the next broadcast" (or a related program which has not been preset for recording) is selected on the starting-program-related information page shown in FIG. 4. In the example shown in FIG. 4, since the program scheduled to be broadcast next time has not been preset for recording, preset recording is included in the methods of operation.

In the detailed presetting screen shown in FIG. 6, detailed information on a related program is displayed, including the program title, the broadcast station and the date and time of broadcast, the contents of the program such as cast, and statistical data such as an audience rating.

After the display of the detailed information on the program, operation commands for the related program are provided. In the illustrated example, recording commands "record this time only", "record every week", and "record every day" are prepared.

A "vote for this program" command is a command prepared to gather statistical data from the audience. When the command is selected, a connection is established by a predetermined URL to a site for which a link is set, and a counting process is performed.

A "display recommendations associated with this program" command causes a process of acquiring information on further related programs for which the related program serves as a starting point, and results of the process are output in the form of a starting-program-related information page. In this case, the starting program moves from that at the time of the operation on the remote controller (see FIG. 4) to that scheduled to be broadcast next. The movement of a starting program will be described later.

Figure 7:
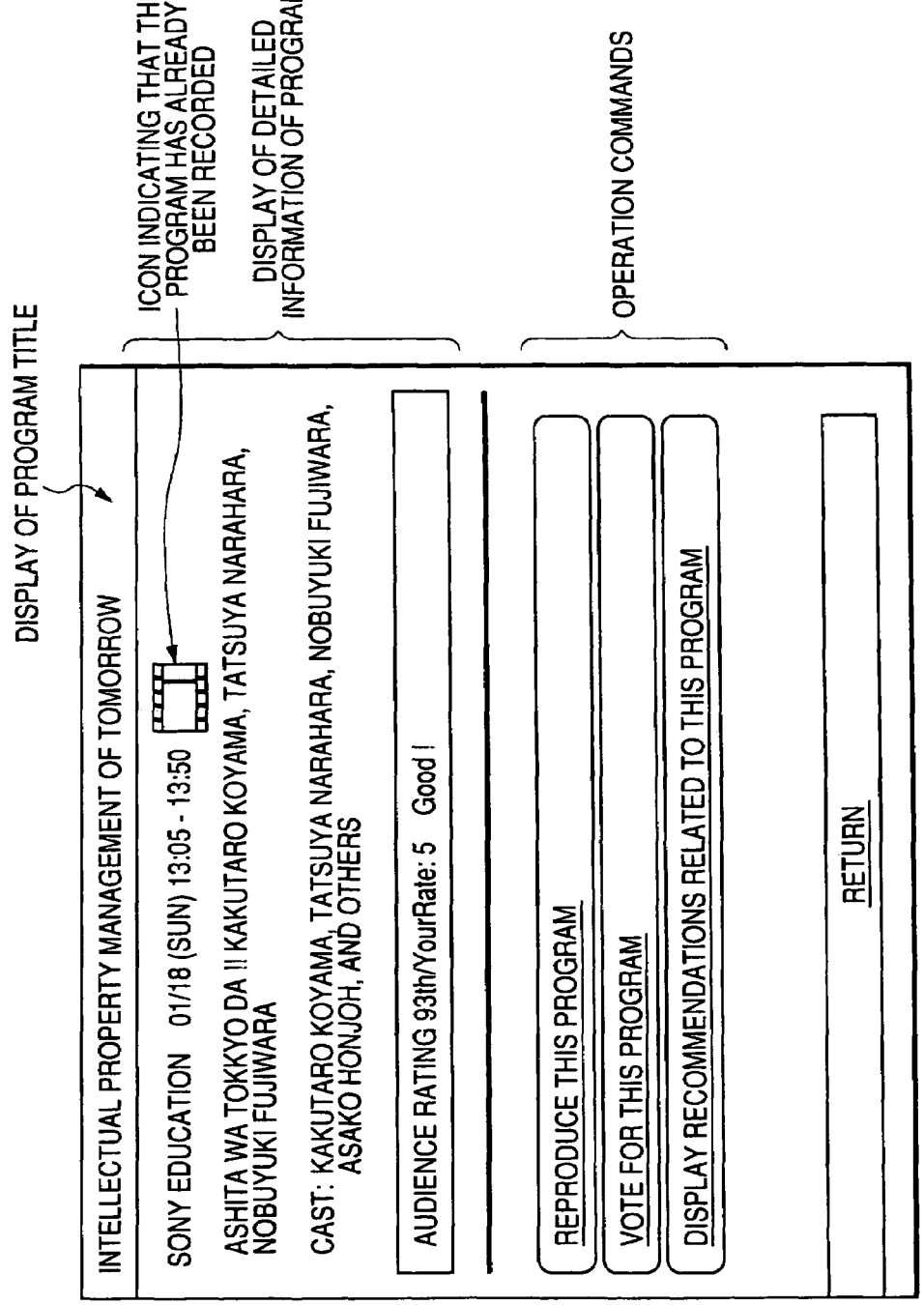
FIG. 7 shows an example of a configuration of a detailed reproduction screen.

FIG. 7 shows a detailed operation screen (a detailed reproduction screen) appearing when a related program which has already been recorded is selected on the starting-program-related information page shown in FIG. 4. Since the related program has already been recorded in this case, methods of operation include reproduction of the related program.

The detailed reproduction screen shown in FIG. 7 displays detailed information on the related program, including the program title, the broadcast station and the date and time of broadcast, the contents of the program such as cast, and statistical data such as an audience rating.

After the display of the detailed information on the program, operation commands for the related program are provided. In the illustrated example, a "reproduce this program" command is prepared as an operation command for a recorded program. A command for erasing a recording may be further prepared.

A "vote for this program" command is a command prepared to gather statistical data from the audience. When the command is selected, a connection is established by a predetermined URL to a site for which a link is set, and a counting process is performed.

A "display recommendations associated with this program" command causes a process of acquiring information on further related programs for which the related program serves as a starting point, and results of the process are output in the form of a starting-program-related information page. In this case, the starting program moves from that at the time of the operation on the remote controller (see FIG. 4) to that scheduled to be broadcast next.

Figure 8:
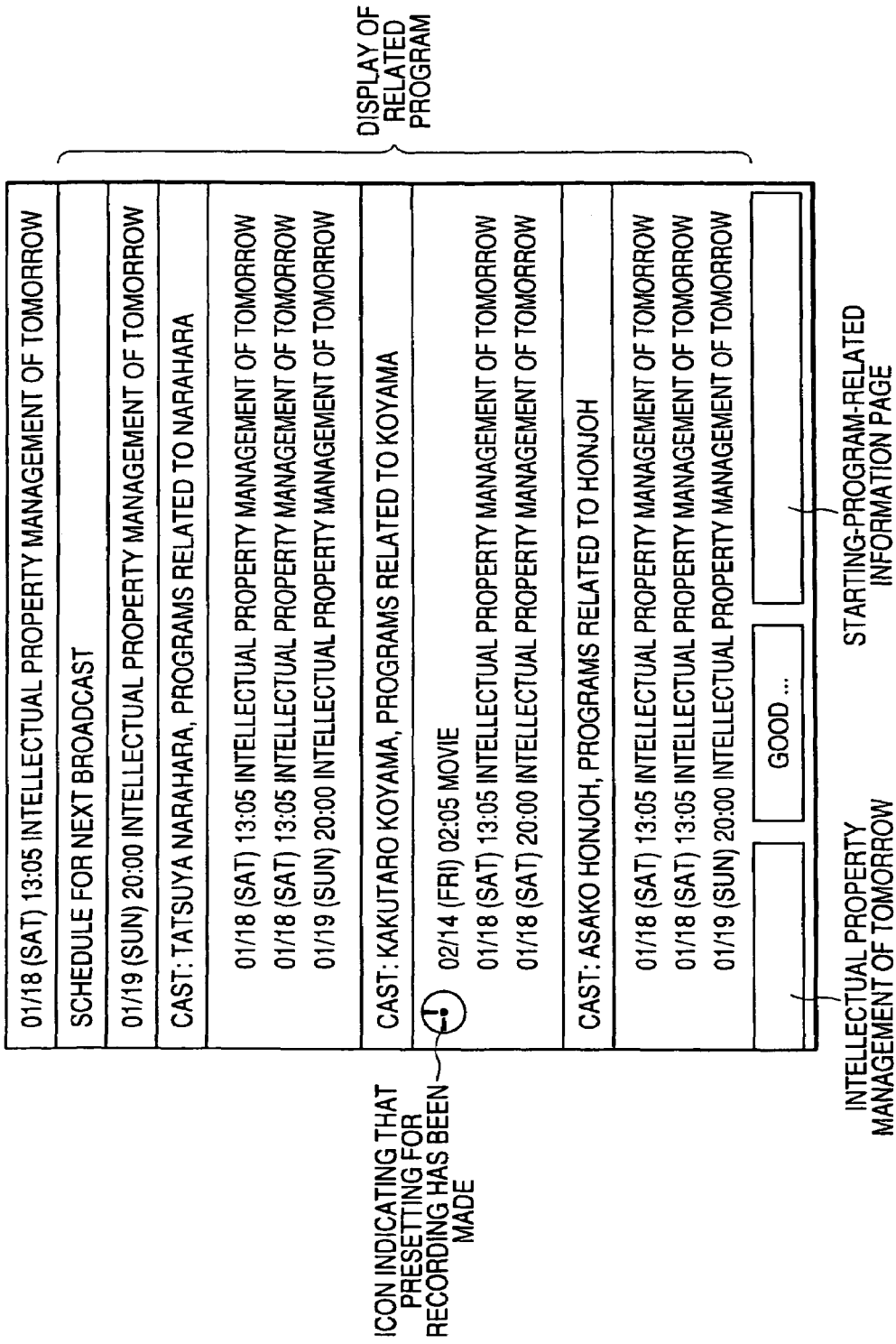
FIG. 8 shows an example of a display of a starting-program-related information page which has been newly generated in response to the selection of a command on the detailed operation screen shown in FIG. 7.

FIG. 8 shows an example of a display of a starting-program-related information page newly generated in response to the selection of the "display recommendations associated with this program" command on the detailed operation screen shown in FIG. 7. The starting-program-related information page displays the schedule for the next broadcast, and programs related to each of the cast of the program. All programs in the past and future in the database are searched. Referring to television programs in the past, only programs which can be watched or which have already been recorded are retrieved and displayed on the page. Referring to a television program in the future, it may be in two states, i.e., it has been already preset for recording or has not been preset for recording yet. On the starting-program-related information page, when a related program has been recorded or preset for recording, the program is accompanied by an icon indicating such a state.

Next, the movement of a starting program will be described. In the example shown in FIGS. 4 and 5, a recorded program in reproduction or a program on the air that is being watched is set as a starting program which is the object of the user's highest interest, and a starting-program-related information page is generated based on degrees of relationship with the starting program. Therefore, the starting-program-related information page presented to the user varies depending on which program is set as the starting point.

As described above, the user can apply processes such as preset recording and reproduction (in the case of programs for which presetting for recording has been made) to related programs presented on the starting-program-related information page. Although the stating program is defined as the program in which the user is most interested, it is assumed that the object of the user's interest has changed when the user instructs presetting for recording or reproduction of another program on the starting-program-related information page. It is therefore considered appropriate to switch the starting program. Further, the user may sometimes wish to switch the starting program intentionally. Steps for switching the starting program will now be described.

Figure 9:
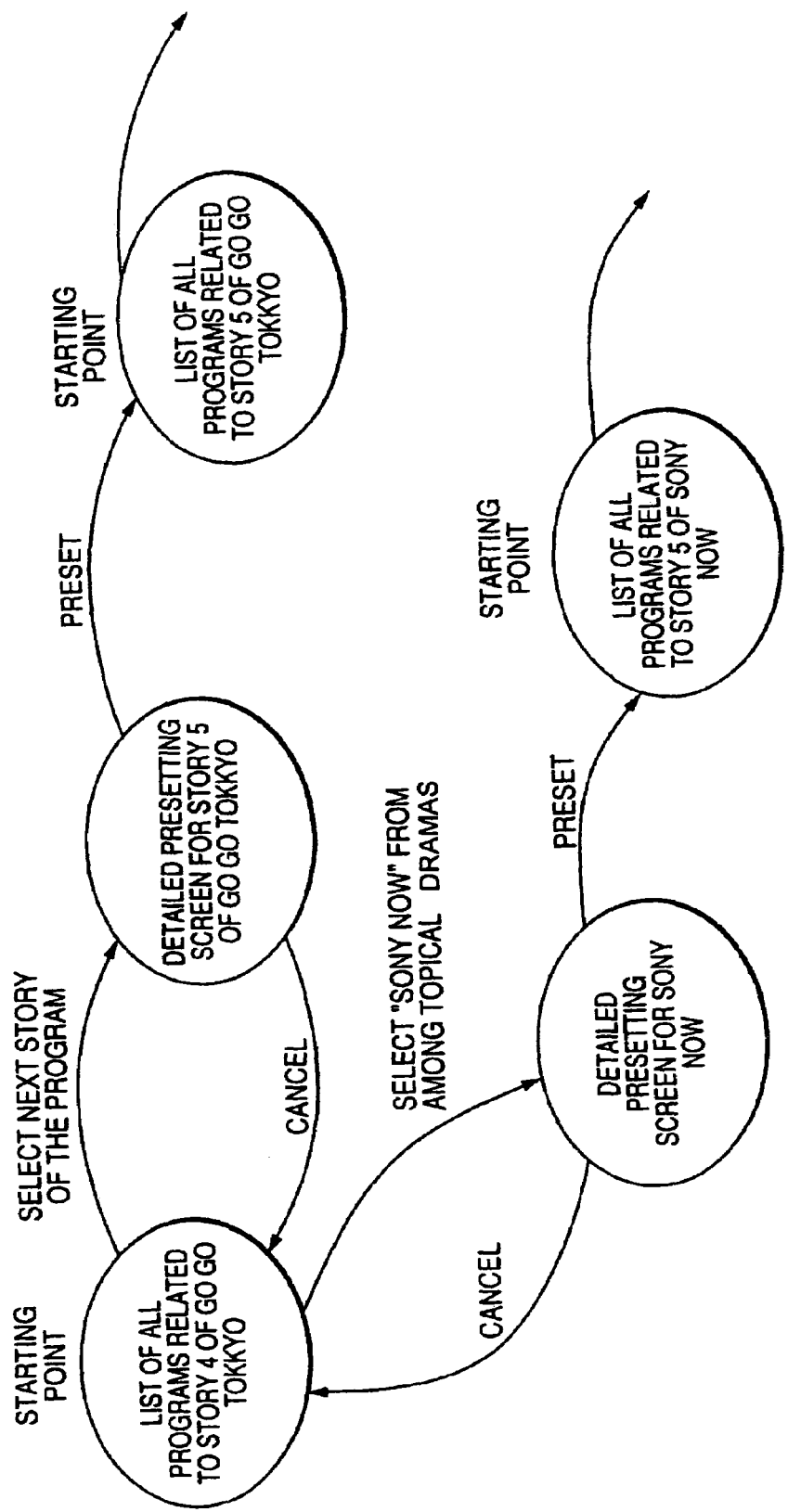
FIG. 9 shows a procedure in which a starting program is moved through operations on the detailed operation screen.

A starting-program-related information page is displayed in response to an operation on a predetermined button on the remote controller 66 while a recorded program is reproduced or while a program on the air is watched. The starting-program-related information page lists information on programs related to the starting program and, when any of the related programs is selected, a detailed operation screen appears to instruct application of processes such as presetting for recording or reproduction to the related program (see FIG. 6). FIG. 9 shows an example of steps for moving the starting program through operations on the detailed operation screen.

For example, when the program scheduled to be broadcast next is selected on the starting-program-related information page, a detailed presetting screen for the program is popup-displayed (see FIG. 6). Although no movement of the starting program occurs when the continuation of the presetting operation is cancelled, when presetting for recording is performed for the program scheduled to be broadcast next, the starting program moves to the preset program. In this case, the program scheduled to be broadcast next is set as the starting point, and the database is searched again for programs related to the starting program with respect to each item. Results of the search in the database are arranged in descending order of the items in the degree of relationship with the starting program and are output for display.

For example, when a program other than the program scheduled to be broadcast next (e.g., a drama/domestic drama-related program) is selected on the starting-program-related information page, a detailed presetting screen for the program is popup-displayed. Although no movement of the starting program occurs when the continuation of the presetting operation is cancelled, when presetting for recording is performed for the program scheduled to be broadcast next, the starting program moves to the preset program. In this case, the program scheduled to be broadcast next is set as the starting point, and the database is searched again for programs related to the starting program with respect to each item. Results of the search in the database are arranged in descending order of the items in the degree of relationship with the starting program and are output for display.

According to the starting point moving method shown in FIG. 9, a program which has been preset for recording becomes a new starting program, and a starting-program-related information page is displayed one after another. Since programs are preset for recording one after another in the form of a rambling-search, the preset recording can be performed for a wider range of programs.

Figure 10:
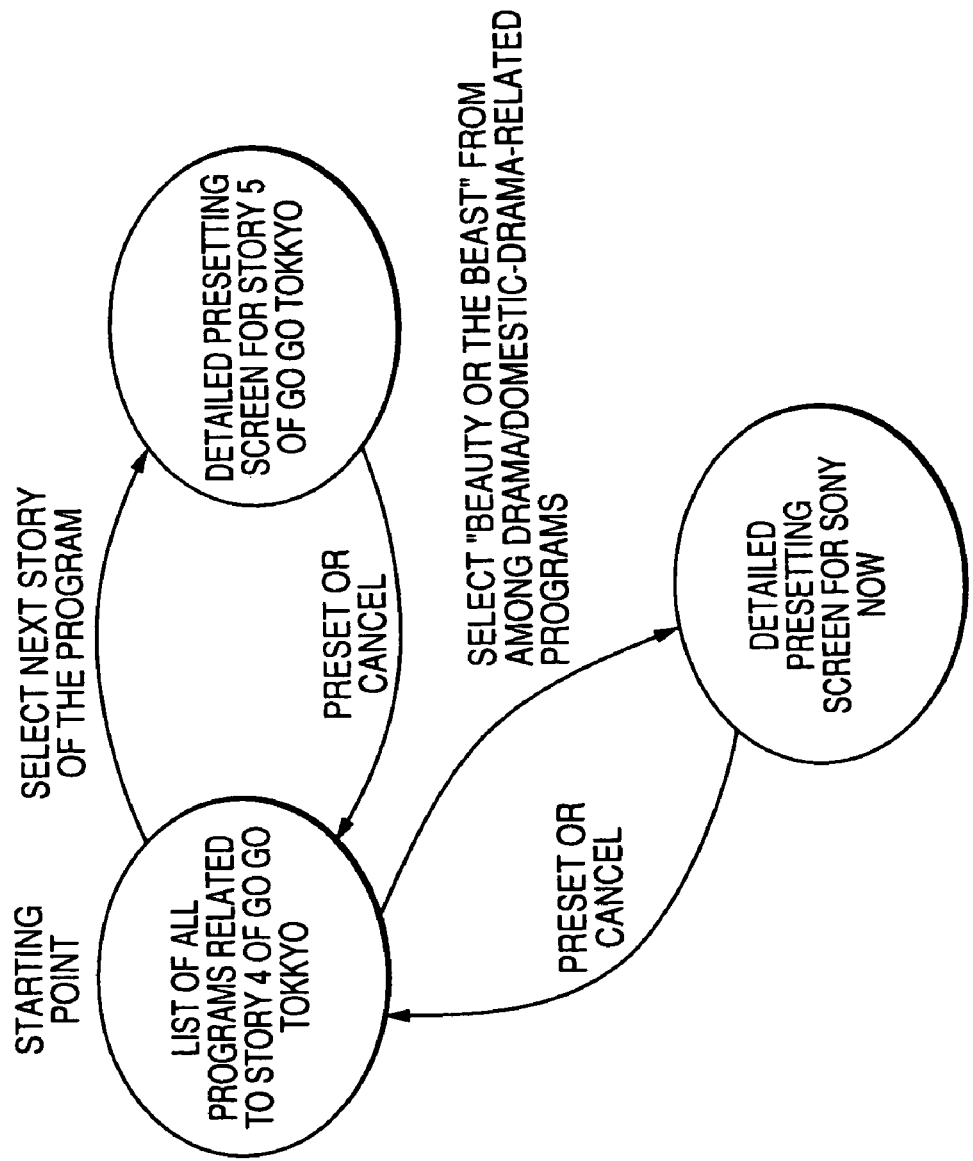
FIG. 10 shows an example of a procedure in which a starting program is not moved.

A starting-program-related information page can be controlled according to a fixed starting point method in which the starting point is not moved conversely to the rambling-search type shown in FIG. 9. FIG. 10 shows steps of an operation of controlling a starting program according to the fixed starting point method. In this case, the starting point always returns to the same program even when a presetting operation is performed on a detailed presetting screen. According to the fixed starting point method, since a presetting operation will not cause any change in recommended programs, it is easy to handle a plurality of programs to be preset for recording in a list of recommended programs.

Figure 11:
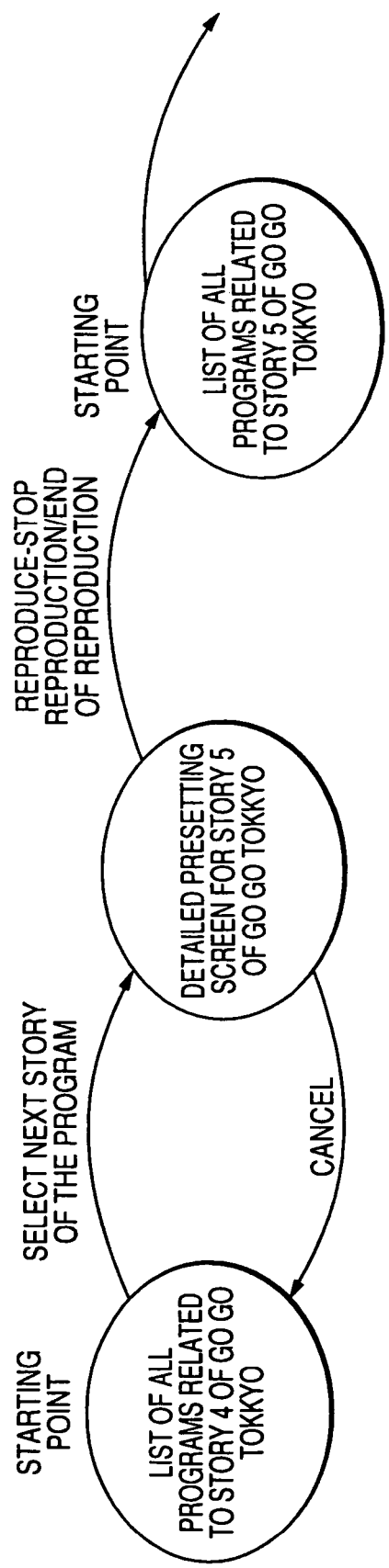
FIG. 11 shows an example of a procedure in which a starting program is automatically moved in response to an instruction for reproduction on a recommended program on the starting-program-related information page.

FIG. 11 shows an example of steps for automatically moving the starting program in response to an instruction for reproduction of a recommended program on a starting-program-related information page (where the program has already been recorded). When a related program which has already been recorded (e.g., the next program) is selected on the starting-program-related information page, a detailed reproduction screen for the program is popup-displayed. Although no movement of the starting program occurs when the reproducing operation is cancelled, if the reproduction operation is started, the starting program moves to the program which has already been recorded. In this case, the reproduced program is set as the starting point, and the database is searched again for programs related to the starting program with respect to each item. Results of the search in the database are arranged in descending order of the items in the degree of relationship with the starting program and are output for display.

Each time a movement of the starting program is allowed as shown in FIGS. 9 and 11, the contents of the old starting-program-related information page are lost. However, some users may wish to access the previous starting-program-related information page again or may wish to have detailed display of some related programs in the previous starting-program-related information page.

Figure 12:
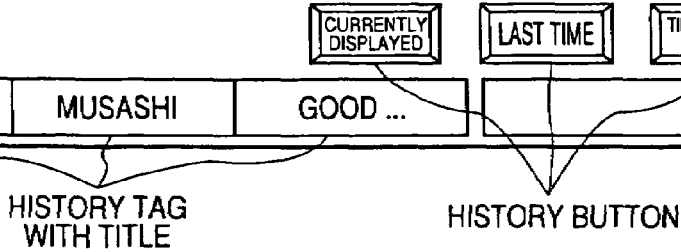
FIG. 12 is an illustration showing buttons for instructing reloading of starting-program-related information on the starting-program-related information page.

For this reason, a history of display of starting-program-related information pages is maintained as shown in FIG. 12. Further, a starting-program-related information page may be provided with history buttons for instructing reloading of respective pieces of original-program-related information, i.e., the currently displayed information, the last information displayed, and the information displayed the time before last. Instead of the history buttons, tags showing a part of program titles may be prepared (on a task bar, for example) side by side in the order of the history of display.

The invention has been described above with reference to specific embodiments thereof. However, it is obvious that modifications and substitutions may be made in the embodiments by those skilled in the art without departing from the gist of the invention. That is, the disclosure of the invention has been made by way of example, and it should not be taken in a limiting sense. Reference should be made to the appended claims to construe the gist of the invention.

The invention makes it possible to provide an excellent information processing apparatus, information processing method, and computer program which can provide a favorable support for contents processing, such as recording, preset recording, and reproduction of a television program.

The invention also makes it possible to provide an excellent information processing apparatus, information processing method, and computer program which can provide a favorable support for operations of contents, such as retrieval, preset recording, and reproduction of a television program, in consideration of the passive nature of the act of watching a television program.

The invention also makes it possible to provide an excellent information processing apparatus, information processing method, and computer program which can provide a favorable support for operations of contents, such as retrieval, preset recording, and reproduction of a television program, without making a user less interested in something which the user has been attracted to while watching a television program.

Each of program contents has a plurality of program states. That is, the program content may have already been recorded, may have not been recorded yet, may have been preset for recording, may not have been preset for recording yet, or may have not been received yet. According to the invention, in response to the selection of a related program on the starting-program-related information page, a detailed operation screen for the related program is presented. Since the detailed operation screen provides an applicable method of operation depending on a program state, a user can smoothly perform operations such as watching, reproduction, and preset recording of program contents.

The invention claimed is:

1. An information processing apparatus for supporting operations on program contents distributed at scheduled times, the information processing apparatus comprising:
a program information managing section which manages information on program contents;
a starting program setting section which sets a program at which the operations are started, wherein the starting program is set based on a user supplying a control signal for selecting, as the starting program, program content being audiovisually rendered for being watched and listened to by the user;
a starting-program-related information generating section which retrieves information on programs in all program states, and extracts programs related to the starting program to generate a starting-program-related information page using information identifying the starting program and in response to the supply of the control signal; and
a detailed operation screen presenting section which presents a detailed operation screen in response to the selection of a program related to the starting program on the starting-program-related information page, the detailed operation screen including a method of operation that can be used for the related program depending on the program state of the related program.

2. An information processing apparatus according to claim 1, wherein the identifying information includes an ID of the set starting program.

3. An information processing apparatus according to claim 1, wherein the starting-program-related information generating section generates the starting-program-related information page by extracting related programs from at least a date of broadcast, a time of broadcast, and a broadcast station name at the time the starting program is set.

4. An information processing apparatus according to claim 1, wherein
the program information managing section manages program information including a plurality of items to which degrees of relationship to programs are assigned; and
the starting-program-related information generating section retrieves programs related to the starting program with respect to each of the plurality of items based on the degrees of relationship to the starting program and generates the starting-program-related information page by arranging results of the retrieval.

5. An information processing apparatus according to claim 4, wherein the starting-program-related information generating section generates the starting-program-related information page from the results of the retrieval by arranging the related programs in descending order of the items in the degrees of relationship to the starting program.

6. An information processing apparatus according to claim 1, further comprising:
a reception section which receives program contents; and
a recording section which performs recording and preset recording of the received program contents;
wherein the program states include at least one of a state in which program contents have already been recorded, a state in which the recording has not been made yet, a state in which presetting for recording has already been made, a state in which presetting for recording has not been made yet, or a state in which program contents have not been received yet.

7. An information processing apparatus according to claim 6, wherein the starting-program-related information generating section displays the program state associated with each piece of related information on the starting-program-related information page.

8. An information processing apparatus according to claim 6, wherein the starting-program-related information generating section displays an icon indicating the program state associated with each piece of related information on the starting-program-related information page.

9. An information processing apparatus according to claim 6, wherein the detailed operation screen presenting section presents reproduction and/or erasure of record as the method of operation when the program state of a selected related program is the state in which program contents have already been recorded.

10. An information processing apparatus according to claim 6, wherein the detailed operation screen presenting section presents cancellation of recording and/or confirmation of presetting as the method of operation when the program state of a selected related program is the state in which presetting for recording has already been made.

11. An information processing apparatus according to claim 6, wherein the detailed operation screen presenting section presents presetting for recording as the method of operation when the program state of a selected related program is the state in which presetting for recording has not been made yet.

12. An information processing apparatus according to claim 11, wherein the detailed operation screen presenting section presents a plurality of methods for presetting for recording.

13. An information processing apparatus according to claim 1, further comprising a section which maintains a display history of the starting-program-related page.

14. An information processing method for supporting operations on program contents distributed at scheduled times where information on each program content is managed using a database, the method comprising:
   setting a program at which the operations are started, based on a user supplying a control signal for selecting, as the starting program, program content being audiovisually rendered for being watched and listened to by the user;
   searching the database for information on programs in all program states to extract programs related to the starting program, wherein the searching uses information identifying the starting program and is in response to the supply of the control signal;
   generating a starting-program-related information page including the extracted related programs; and
   presenting a detailed operation screen in response to the selection of a program related to the starting program on the starting-program-related information page, the detailed operation screen including a method of operation that can be used for the related program depending on the program state of the related program.

15. An information processing method according to claim 14, wherein the searching the database includes extracting related programs from an ID of the starting program.

16. An information processing method according to claim 14, wherein the searching the database includes extracting related programs from at least a date of broadcast, a time of broadcast, and a broadcast station name at the time the starting program is set.

17. An information processing method according to claim 14, wherein
   the database manages program information including a plurality of items to which degrees of relationship to programs are assigned; and
   the generating the starting-program-related information page includes retrieving programs related to the starting program with respect to each of the plurality of items based on the degrees of relationship with the starting program and generating a starting-program-related information page by arranging results of the retrieval.

18. An information processing method according to claim 17, wherein the generating the starting-program-related information page includes generating the starting-program-related information page from the results of the retrieval by arranging the related programs in descending order of the items in the degrees of relationship with the starting program.

19. An information processing method according to claim 14, wherein the program states include at least one of a state in which program contents have already been recorded, a state in which the recording has not been made yet, a state in which presetting for recording has already been made, a state in which presetting for recording has not been made yet, or a state in which program contents have not been received yet.

20. An information processing method according to claim 19, wherein the generating the starting-program-related information page includes displaying the program state associated with each piece of related information on the starting-program-related information page.

21. An information processing method according to claim 19, wherein the generating the starting-program-related information page includes displaying an icon indicating the program state associated with each piece of related information on the starting-program-related information page.

22. An information processing method according to claim 19, wherein the presenting the detailed operation screen includes presenting reproduction and/or erasure of record as the method of operation when the program state of a selected related program is the state in which program contents have already been recorded.

23. An information processing method according to claim 19, wherein the presenting the detailed operation screen includes presenting cancellation of recording and/or confirmation of presetting as the method of operation when the program state of a selected related program is the state in which presetting for recording has already been made.

24. An information processing method according to claim 19, wherein the presenting the detailed operation screen includes presenting presetting for recording as the method of operation when the program state of a selected related program is the state in which presetting for recording has not been made yet.

25. An information processing method according to claim 24, wherein the presenting the detailed operation screen includes presenting a plurality of methods for presetting for recording.

26. An information processing method according to claim 14, further comprising maintaining a display history of the starting-program-related page.

27. A computer readable recording medium recorded with a computer program for executing a process for supporting operations on program contents distributed at scheduled times where information on each program content is managed using a database, the process comprising:
   setting a program at which the operations are started, based on a user supplying a control signal for selecting, as the starting program, program content being audiovisually rendered for being watched and listened to by the user;
   searching the database for information on programs in all program states to extract programs related to the starting program, wherein the searching uses information identifying the starting program and is in response to the supply of the control signal; and generating a starting-program-related information page including the extracted related programs; and
   presenting a detailed operation screen in response to the selection of a program related to the starting program on the starting-program-related information page, the detailed operation screen including a method of operation that can be used for the related program depending on the program state of the related program.

* * * * *